United States Patent Office 3,419,230
Patented Dec. 31, 1968

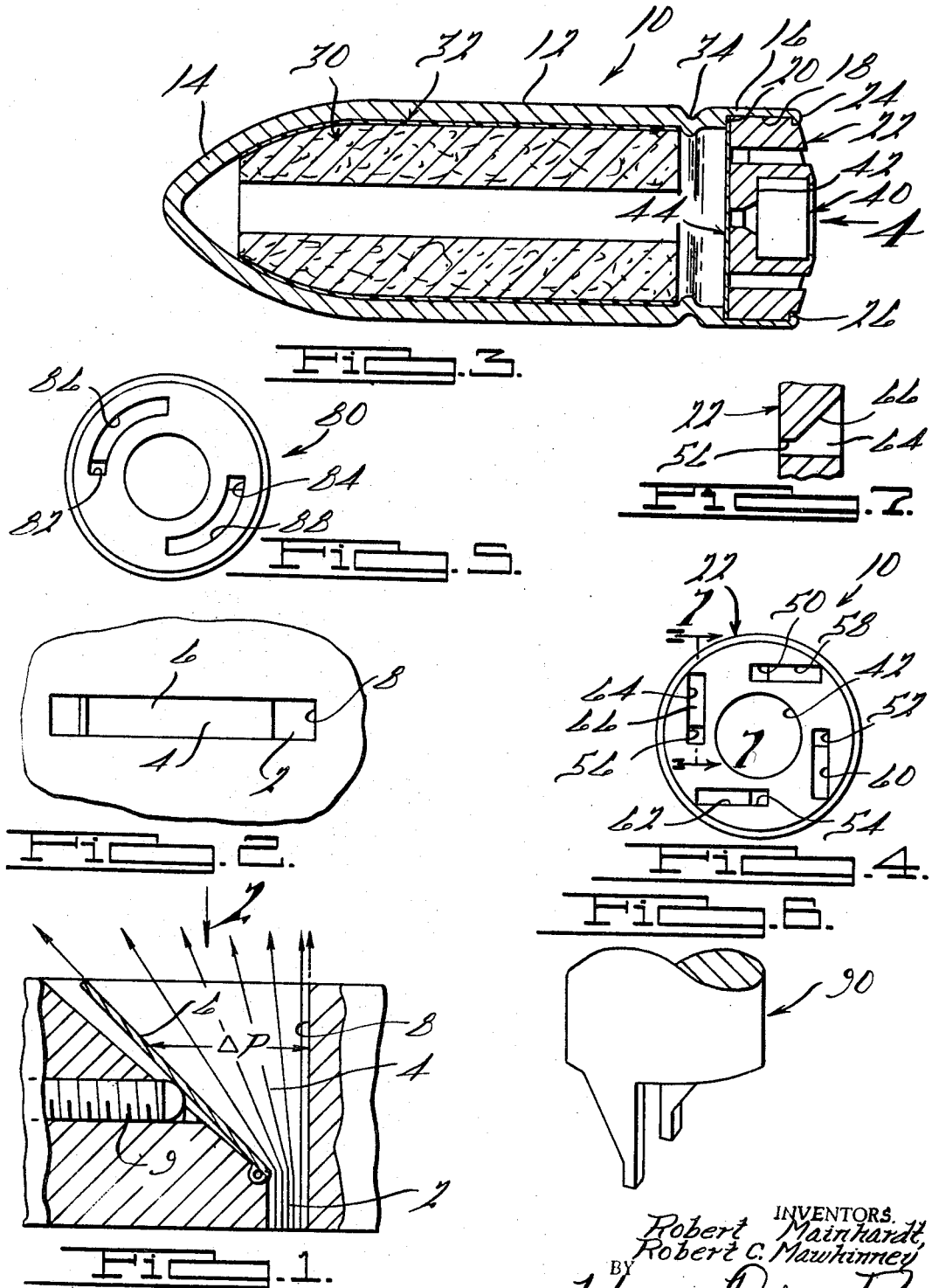

3,419,230
NOZZLE
Robert Mainhardt, Diablo, and Robert C. Mawhinney, Castro Valley, Calif., assignors to MB Associates, San Ramon, Calif., a corporation of California
Filed Apr. 14, 1966, Ser. No. 542,603
6 Claims. (Cl. 244—3.23)

ABSTRACT OF THE DISCLOSURE

A gyroscopically stabilized miniature rocket projectile having nozzles each of which comprises a longtiudinal orifice and a slot flaring rearwardly to one side thereof to create a lateral pressure differential tending to spin the projectile.

---

This invention relates generally to nozzles and more particularly to a nozzle capable of exerting a lateral thrust relative to the direction of fluid flow therethrough.

Nozzles heretofore known and used capable of exerting thrust laterally of the direction of fluid flow or flight direction have either utilized baffles that extend into the fluid stream at an angle thereto or have required that the nozzle itself and therefore fluid flow therethrough be at an angle relative to the direction of flight of, for example, a projectile. Such known nozzles are relatively inefficient in terms of fluid dynamics since the primary component of the exit thrust vector, namely, flight direction thrust, is significantly smaller than the exit thrust vector itself.

Broadly, the present invention is directed to an improved nozzle that maximizes flight direction thrust consonant with a desired lateral thrust. This is accomplished by utilizing what is herein termed "one dimension" expansion of a fluid wherebly lateral thrust is effected without requiring insertion of either a flow impeding baffle into the flow stream or requiring angular orientation of the nozzle relative to flight direction.

A constructed embodiment of the present invention is disclosed in an environment wherein it has significant practical utility, namely, in an improved nozzle capable of gyroscopically stabilizing solid propellant rockets.

Extensive research into miniature rocket projectiles indicates that gyroscopic stabilization thereof maximizes control and therefore the flight predictability of such projectiles. However, it has heretofore been a problem to achieve the extremely high rotational velocities necessary to effect stabilization of such miniature rockets without impairing either the acceleration or the linear velocity characteristics of the projectile.

This problem is solved, in accordance with the insant invention, by a nozzle comprising an orifice of relatively small cross sectional area through which fluid flow is unimpeded by baffles. Further, the central axis of the orifice is orientated parallel to the axis of flight of the projectile.

Lateral thrust is obtained by a novel "one dimension" expansion slot having a width generally equal to the width of the orifice and communicating therewith. One relatively narrow edge wall of the expansion slot extends at an angle relative to the central axis of the orifice to permit expansion of gases in one lateral direction only and the other edge wall being coextensive with the orifice wall and parallel to the central axis thereof. Since the velocity of fluid flow along the angularly orientated edge wall of the expansion slot is relatively greater than the velocity of fluid flow parallel to the axis of the orifice, a lateral pressure differential is created across the expansion slot capable of exerting a force on the edge wall that extends parallel to the central axis of the orifice. Because the pressure differential across the expansion slot is a function of the angle of divergency of the divergent edge wall of the slot relative to the central axis of the orifice, control of lateral thrust can be achieved by varying the angle of divergency of the movable edge wall. This feature has utility in projectiles wherein variable lateral thrust must be achieved to effect directional control thereof.

Set in the herein disclosed environment of a gyroscopically stabilized miniature rocket projectile, the divergent edge wall of the expansion slot remains fixed. In the disclosed embodiment, the nozzle comprises a generally cylindrical member that closes the end of the rocket casing. The nozzle has at least two axially extending orifices spaced symmetrically around and radially spaced from the central axis thereof. The orifices communicate with circumferentially extending "one dimension" expanson slots, respectively, spaced from the central axis of the nozzle and lying either in planes parallel to said central axis of the nozzle and lying either in planes parallel to said central axis of the nozzle and perpendicular to a radius thereof or lying concentrically to the central axis of the nozzle. The novel longitudinal cross section of the expansion slot imparts an extremely high rotational velocity as well as maximum linear-velocity to the rocket as a result of unimpeded flow of exhaust gas therethrough.

Accordingly, one object of the present invention is an improved nozzle having a lateral thrust component.

Another object is an improved expansion slot configuration for a rocket nozzle.

Another object of the present invention is an improved rocket nozzle for miniature gyroscopically stabilized rockets.

Additional objects of the invention will become apparent from the following description, claims and drawings, wherein:

FIGURE 1 is a fragmentary diagrammatic cross sectional view of an improved rocket nozzle in accordance with the present invention;

FIG. 2 is a view taken in the direction of the arrow 2 of FIG. 1;

FIG. 3 is a sectional view of a rocket projectile utilizing a nozzle in accordance with the present invention;

FIG. 4 is a view taken in the direction of the arrow 4 of FIG. 3;

FIG. 5 is a modified rocket nozzle utilizing the present invention;

FIG. 6 is a tool usable in manufacturing the nozzle of FIG. 5, and

FIG. 7 is a cross sectional view taken substantially along the line 7—7 of FIG. 4.

As best seen in FIGS. 1 and 2, a nozzle in accordance with the instant invention comprises an orifice 2 that communicates with a relatively narrow expansion slot 4 that has one edge wall 6 that is angularly related to the central axis of the orifice 2. Since fluid flow of the nozzle behaves in accordance with the equation $P_1V_1 = mRT = P_2V_2$ it follows that a pressure differential exists across the nozzle tending to exert a force on the edge wall 8 thereof. Since the pressure differential across the nozzle is a function of the angle of the edge wall 6 relative to the central axis of the orifice 2, it follows that the lateral force exerted on the wall 8 may be controlled by varying the angle of the edge wall 6 as by a control mechanism 9.

Turning now to one environment wherein the instant invention has significant utility, and as best seen in FIG. 3 of the drawings, a gyroscopically stabilized miniature rocket 10, in accordance with an exemplary constructed embodiment of the instant invention, comprises a cylindrical casing 12 made from, for example, steel, having a prolate hemispherical nose portion 14 and an annular rear end portion 16. The rear end portion 16 of the casing 12 has a counterbore 18 therein that defines a radial shoulder 20 for the seating acceptance of a nozzle 22.

A terminal edge portion 24 of the casing 12 is rolled over a complementary annular shoulder 26 on the nozzle 22 to secure the nozzle 22 against the radial seat 20.

A hollow cylindrical slug 30 of non-detonable double-base propellant, for example, propellant known in the art as ARP, N–5, JPN, or the like, is inserted into the casing 12 and pressed into place under a pressure of, for examplate, 30 p.s.i. A thin layer of inhibiter 32, for example, titanium impregnated latex, is preferably applied to the exterior surface of the cylindrical propellant slug 30 before insertion or applied to the interior of the casing 12 before insertion of the propellant slug 30 thereinto. An annular radially inwardly extending bead 34 is rolled into the casing 12 after insertion of the propellant slug 30 thereinto to preclude rearward movement of the propellant slug 30 due to the high inertia forces experienced during acceleration of the projectile 10.

The nozzle 22 is provided with a high intensity primer 40 that is accepted in a complementary seat 42. If desired, a small amount of nitrocellulose igniter (not shown) sufficient to insure ignition of the propellant slug 30 may be placed into the casing 12 prior to insertion of the propellant slug 30 thereinto.

Hermetic sealing of the projectile 10 is achieved by a relatively thin rupturable aluminum diaphragm 44, of, for example, one mil thickness, which is fastened to the inside of the nozzle by a pressure or heat sensitive adhesive. The diaphragm 44 functions both as a hermetic seal for the rocket 10 as well as to facilitate pressure buildup internally of the casing 12 upon firing of the primer 40 to insure proper ignition of the propellant 30. The diaphragm 44 also serves as a gasket between the nozzle seat 20 and nozzle 22.

As best seen in FIG. 4 of the drawings, the principles discussed hereinbefore are carried into practice by providing the nozzle 22 with a plurality of orifices 50, 52, 54 and 56 that are orientated in a geometrically balanced array about the central axis of the nozzle 22.

Each of the orifices 50, 52, 54 and 56 is provided with a "one dimension" expansion slot 58, 60, 62 and 64, respectively, to provide for expansion of discharge gases in one direction only circumferentially of the nozzle 22. Each expansion slot 58, 60, 62 and 64 has one edge wall inclined at an angle of, for example, 20 to 70 degress relative to the longitudinal axis of the projectile. In the constructed embodiment illustrated in FIG. 7 an edge wall 66 extends at an angle of approximately 45° relative to the longitudinal axis of the projectile 10. Since the velocity of the escaping gases immediately adjacent the inclined wall 6 of the expansion slot 64 is relatively greater than the velocity of the gases adjacent the axially directed wall thereof, the pressure differential created laterally across the expansion slot 64 tends to spin the projectile 10.

It is to be noted that the expansion slots 58, 60, 62 and 64 provide no impediment whatsoever to longitudinal flow of the exhaust gases thereby maximizing the acceleration and velocity characteristics of the projectile consonant with the pressure characteristics of the propellant 30 and other physical characteristics of the projectile 10.

As seen in FIG. 5 of the drawings, a modified nozzle 80 is provided with a pair of axially extending orifices 82 and 84 and a pair of circumferentially extending narrow arcuate expansion slots 86 and 88, respectively. The physical characteristics of the nozzle illustrated in FIG. 5 is substantially the same as that illustrated in FIG. 4 because gas expanding through the orifices 82 and 84 is free to expand in only one dimension circumferentially of the nozzle 80 thereby to develop only a single moment about the longitudinal axis of a projectile.

As best seen in FIG. 6 of the drawings, the nozzle illustrated in FIG. 5 can easily be fabricated by conventional techniques, by using a male die 90 having the desired orifice and slot configuration in conjunction with, for example, punching, stamping powder metallurgical pressing, hot pressing, hot punching, hot stamping, injection molding, die casting, heading, or investment casting processes. It is also contemplated that the unique nozzle configuration hereinbefore discussed can be formed directly into the casing 12 as by hot or cold punching or piercing thereby eliminating a separate nozzle and casing.

In an exemplary constructed embodiment, the nozzle 22 is made from powdered electrolytic iron having from 20 to 50 points of carbon. Electrolytic iron powder is compressed in male and female dies having the orifice and expansion slot configuration herein disclosed. The individual nozzles are then sintered in a reducing atmosphere to a reltively high density. Thereafter, the nozzle is assembled with the other components of the rocket 10 without requiring secondary operations.

It is to be understood that the specific construction of the improved nozzle herein disclosed and described is presented for the purpose of explanation and illustration and is not intended to indicate limits of the invention, the scope of which is defined by the following claims.

What is claimed is:

1. A nozzle capable of exerting thrust laterally of the direction of fluid flow therethrough comprising an orifice having a longitudinal axis, and a relatively narrow expansion slot contiguous with and extending to one side of said orifice, said expansion slot having one relatively narrow edge wall extending at a rearwardly flaring angle relative to the axis of said orifice and an opposite relatively narrow edge wall extending parallel to the central axis of said orifice, all wall surfaces of said orifice and slot being in non-obstructing relation with rearward longitudinal fluid flow, whereby longitudinal fluid flow through said expansion slot is unimpeded and creates a pressure differential between said narrow edge walls thereby producing a lateral thrust on said nozzle relative to the longitudinal axis of said orifice.

2. A nozzle in accordance with claim 1 wherein the side walls of said expansion slot connecting said narrow edge walls thereof, respectively, are closely spaced, flat and parallel to one another.

3. A nozzle in accordance with claim 1 wherein the side walls of said expansion slot connecting said narrow edge walls thereof, respectively, are closely spaced, arcuate and concentric with one another.

4. A nozzle capable of exerting thrust laterally of the direction of fluid therethrough comprising an orifice having a longitudinal axis, and a relatively narrow expansion slot contiguous with and extending to one side of said orifice, said expansion slot having one relatively narrow edge wall extending at an angle relative to the axis of said orifice and an opposite relatively narrow edge wall extending parallel to the central axis of said orifice whereby longitudinal fluid flow through said expansion slot is unimpeded and creates a pressure differential between said narrow edge walls thereby producing a lateral thrust on said nozzle relative to the longitudinal axis of said orifice, the angle of the angularly extending side wall of said expansion slot being variable relative to the longitudinal axis of said orifice thereby to vary the lateral thrust of said nozzle.

5. A nozzle in accordance with claim 1 having at least two orifices and expansion slots in a geometrically balanced array.

6. A gyroscopically stabilized miniature rocket projectile comprising, a tubular casing having a central longitudinal axis, means for producing a high pressure fluid in said casing, and a nozzle for controlling expansion of said fluid, said nozzle comprising, a pair of orifices having longitudinal axes, respectively, extending parallel to the central longitudinal axis of said projectile and radially spaced therefrom, and a pair of relatively narrow expansion slots extending generally circumferentially of said nozzle and contiguous with said orifices, respectively, one relatively narrow edge wall of each of said expansion slots extending at a rearwardly flaring angle relative to the avis of its associated orifice and the opposite relatively narrow edge wall extending parallel to the central axis of said associated orifice and coextensive therewith, all wall surfaces of said orifices and slots being in non-obstructing relation with rearward longitudinal fluid flow, whereby longitudinal fluid flow in said expansion slots creates a lateral pressure differential between said narrow edge walls having an effective thrust tending to spin said projectile.

References Cited

UNITED STATES PATENTS

| | | | |
|---|---|---|---|
| 2,654,552 | 10/1953 | Jonas | 244—3.22 X |
| 2,750,887 | 6/1956 | Marcus | 60—201 |
| 3,017,748 | 1/1962 | Burnside | 102—49 X |

FOREIGN PATENTS

| | | |
|---|---|---|
| 141,187 | 4/1920 | Great Britain. |
| 831,487 | 6/1938 | France. |

BENJAMIN A. BORCHELT, *Primary Examiner.*

VERLIN R. PENDEGRASS, *Assistant Examiner.*

U.S. Cl. X.R.

60—201; 239—265.11